(12) United States Patent
Singh et al.

(10) Patent No.: US 6,484,276 B1
(45) Date of Patent: Nov. 19, 2002

(54) METHOD AND APPARATUS FOR PROVIDING EXTENSIBLE OBJECT-ORIENTED FAULT INJECTION

(75) Inventors: Navjot Singh, Morristown, NJ (US); Timothy Tsai, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/426,331

(22) Filed: Oct. 25, 1999

(51) Int. Cl.[7] .................................................. G06F 11/30
(52) U.S. Cl. ........................ 714/41; 714/38; 717/125; 717/127
(58) Field of Search ............. 714/38, 41; 717/124–127, 717/100, 108, 116

(56) References Cited

U.S. PATENT DOCUMENTS

| | | |
|---|---|---|
| 4,759,019 A | 7/1988 | Bently et al. |
| 4,999,837 A | 3/1991 | Reynolds et al. |
| 5,671,352 A | 9/1997 | Subrahmaniam et al. |
| 6,405,363 B1 * | 6/2002 | Carlson et al. ............. 709/332 |

OTHER PUBLICATIONS

Mei–Chen Hsueh et al., IEEE Computer, "Fault Injection Techniques and Tools", Apr. 1997, vol. 30, Issue 4, pp. 75–82.*

Amana Cibele Apolinario Rosa et al., OOPSLA'98 Workshop #13, Vancouver, Canada, "Using a Reflective Architecture to Validate Object–oriented Applications by Fault Injection", Oct. 18, 1998.*

N. P. Kropp et al., "Automated Robustness Testing of Off–the–Shelf Software Components", Proceedings28th International Symposium on Fault–Tolerant Computing, (FTCS), pp. 231–239, Munich, Germany Jun. 1998.

* cited by examiner

Primary Examiner—Scott Baderman
Assistant Examiner—Joshua Lohn
(74) Attorney, Agent, or Firm—Thomas Stafford

(57) ABSTRACT

A method and apparatus for a fault injection tool having greater flexibility, ease and portability in realizing the basic functionality of the fault injection. The basic functionality of the fault injection process is abstracted into three base classes, namely, a fault injector (FI), a workload generator (WG) and a data collector (DC). A control class performs configuration and management of the objects that are instantiated from the base classes. The control class also implements a graphical user interface. For each base class there is a corresponding core class that performs control and management of a so-called associated "plugin". Each of the core classes can be implemented as a single class or as a pair of distributed classes. If a core class is implemented as a pair, the FI, WG, or DC object controls operation of the FIRemote, WGRemote or DCRemote object, respectively. For each core class, the associated plugin performs the actual functionality. A plugin is a dynamically loaded object that can be linked with the object instantiated from the core class without recompilation of the core class. Each plugin includes at least a corresponding base class and, possibly, hierarchical derived custom classes from the base class. Many actions performed by plugins are identical or similar for a wide range of fault injection, workload and data collection processes. These identical and similar actions are implemented in the abstract base classes. Intermediate classes can be derived from the base classes, and additional intermediate classes or the final end classes are derived from these intermediate classes.

42 Claims, 12 Drawing Sheets

FAULT INJECTION CLASS ARCHITECTURE

FAULT INJECTION CLASS CONTROL-FLOW

DATA COLLECTION CLASS ARCHITECTURE

DATA COLLECTION CLASS CONTROL-FLOW

FIG. 8

| TABLE 1 | | |
|---|---|---|
| rootPath | Required? | Description |
| rootPath | Yes | The top-most ntDTS directory |
| rshPath | Yes* | The path for rsh.exe |
| javaPath | Yes | The path for java.exe |
| faultFilename | Yes* | The name of the fault list file |
| remoteMachine | Yes | The name of the target machine |
| runTimeout | No | Seconds before assuming target machine is hung (default is 180 seconds) |
| absoluteMaxiter | No | Number of interations to inject for each function (default is 1) |
| automaticStart | No | If 1 and main configuration file is specified on command line, then automatically start injections |
| numWorkloads | Yes | The number of workload sets |
| workloads | Yes | The list of workload programs and parameters |

FIG. 9

| TABLE 2 | | |
|---|---|---|
| Parameter | Required? | Description |
| title | Yes | Text description of workload |
| faultFilename | No* | Name of the fault list file for this workload; overrides global faultFilename |
| WGplugin | Yes | Name of the Java class that produces the workload |
| DCplugin | Yes | Name of the Java class that gathers results |
| savefile | Yes | Name of file to save results to |
| targetinv | No | Which process in workload to inject (default is 1) |

FIG. 10

```java
import java.io.*;

class WGRPClusterServiceApacheHttpClient extends WGRPClusterServiceBase {
///////////////////////////////////////
//Start workload methods
public void run WorkloadStartWorkload()
   throws IOException, InterruptedException
{
   clusterGroupName = "Apache_Group";
   serviceName = "Apache";
   serviceProcessName = "Apache";
   clientIsLocal = true;
   clientName = "HttpClient";

startService(clusterGroupName, serviceName, serviceProcessName);
   if (earlyExit) return;
   startClient();
}

///////////////////////////////////////
//Kill methods
public void stop WorkloadMethods() {
   killClient();
   killService(clusterGroupName, serviceName, serviceProcessName);
}
}
```

FIG. 11

```
clusterGroupName = Apache_Group;
serviceName = Apache;
serviceProcessName = Apache;

clientIsLocal = true;
clientName = HttpClient;
# remoteClient = ????;        # Commented out since clientIsLocal = true
```

| TABLE 3 | | |
|---|---|---|
| Parameter | Required? | Description |
| targetinv | Yes | Which process in workload to inject |
| function | Yes | Name of the function to inject |
| parameter | Yes | Which parameter to inject |
| interation | Yes | Which invocation of the function to inject |
| fault type | Yes | Type of fault to inject; (0=reset all bits to zero; 1=set all bits to one; 2= XOR all bits with 0x1) |

US 6,484,276 B1

METHOD AND APPARATUS FOR PROVIDING EXTENSIBLE OBJECT-ORIENTED FAULT INJECTION

TECHNICAL FIELD

This invention relates to system dependability testing and, more particularly, to such testing via fault injection.

BACKGROUND OF THE INVENTION

Fault injection arrangements and techniques are known in the art. For the most part, prior known fault injection arrangements have limited flexibility regarding accommodation of hardware and software platforms, programs, and fault injection techniques. Indeed, fault injection is a necessity when testing the robustness of a system to unintended or unexpected events, because such events are often extremely difficult to produce through use of traditional testing techniques. See for example, an article by N. P. Kropp, P. J. Koopman and D. P. Siewiorek entitled "Automated robustness testing of off-the-shelf software components", *Proceedings 28th International Symposium on Fault-Tolerant Computing*, (FTCS-28), pages 231–239, Munich Germany, June 1998, for one such prior fault injection tool. Notwithstanding, a significant obstacle to the task of systematic testing of system dependability is still the lack of flexible, easy-to-use fault injection tools.

SUMMARY OF THE INVENTION

The problems and limitations of prior fault injection tools are overcome in a unique fault injection tool based on an object-oriented architecture in which identical or similar functionality is abstracted out into so-called base classes, and is implemented in an object-oriented program language. This results in a fault injection tool having greater flexibility, ease and portability in realizing the basic functionality of the fault injection process including fault injection, workload generation and data collection.

Specifically, the basic functionality of the fault injection process is abstracted into three base classes, namely, a fault injector, a workload generator and a data collector. A control class performs configuration and management of the objects that are instantiated from the base classes. The control class also implements a graphical user interface. For each base class there is a corresponding core class that performs control and management of a so-called associated "plugin". Each of the core classes can be implemented as a single class or as a pair of distributed classes. For example, the fault injector (FI) core class can be implemented as a single FI core class or as a FI/FIRemote pair. Similarly, the workload generator (WG) core class can be implemented as a single WG core class or as a WG/WGRemote pair. Likewise, the data collector (DC) core class can be implemented as a single DC core class or as a DC/DCRemote pair. If a core class is implemented as a pair, the FI, WG or DC object controls operation of the FIRemote, WGRemote or DCRemote object, respectively. For each core class, the associated plugin performs the actual functionality. A plugin is a dynamically loaded object that can be linked with the object instantiated from the core class without recompilation of the core class. Each plugin includes al least a corresponding base class and, possibly, hierarchical derived custom classes from the base class. The hierarchical derived custom classes facilitate software reuse and facilitate the creation of plugins. Many actions performed by the plugins are identical or similar for a wide range of fault injection, workload and data collection processes. These identical and similar actions are implemented in the abstract base classes. Intermediate classes can be derived from the base classes, and additional intermediate classes or the final end classes are derived from these intermediate classes.

BRIEF DESCRIPTION OF THE DRAWING

FIG. 8 is a graphical representation of TABLE 1 including a list of parameters in a main configuration file;

FIG. 9 is a graphical representation of TABLE 2 including a list of workload parameters;

FIG. 10 shows program code for a sample final plugin class;

FIG. 11 shows the plugin configuration file for the workload associated with the final plugin class of FIG. 10;

DETAILED DESCRIPTION

Figure 1:
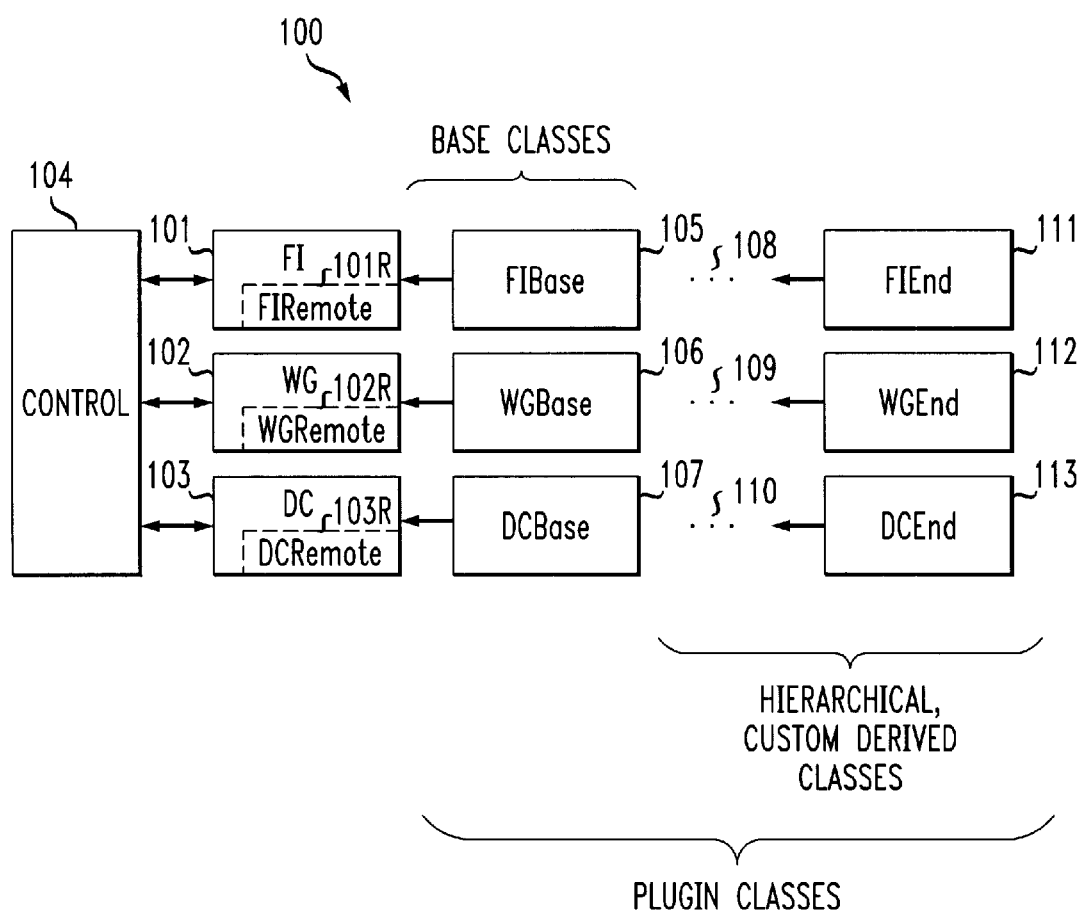
FIG. 1 shows, in simplified form, details of fault injector tool architecture including an embodiment of the invention.

FIG. 1 shows, in simplified form, details of fault injection tool architecture 100 including an embodiment of the invention. Several unique features of architecture 100 form the basis for the enhanced flexibility, ease and portability of performing fault injection. The basic functionality of our unique fault injection process invention is abstracted into three base classes, namely, Fault Injector Base (FIBase) class 105, Workload Generator Base (WGBase) class 106 and Data Collector Base (DCBase) class 107. These base classes may be implemented as base Java classes. This unique embodiment of the unique fault injection invention is sufficiently general to handle substantially all fault injection requirements and also allows each base class to be specialized for its particular functionality. For each base class there is a corresponding core class, namely, Fault Injector (FI) 101, Workload Generator (WG) 102 and Data Collector (DC) 103. Each of the three core classes is implemented as a single class or a pair of distributed classes. The FI 101 class is implemented as a single FI class or as a FI/FIRemote pair, including both FI 101 and FIRemote 101R. Similarly, the WG 102 class is implemented as a single WG class or as a WG/WGRemote pair, including both WG 102 and WGRemote 102R. Finally, the DC 103 class is implemented as a single DC class or as a DC/DCRemote pair, including both DC 103 and DCRemote 103R. If a core class is implemented as a pair, then FI 101, WG 102 or DC 103 object controls the operation of FIRemote 101R, WGRemote 102R or DCRemote 103R, respectively. Control class 104 performs the configuration and management of objects that are instantiated from core classes 101, 102 and 103. Control class 104 also implements a graphical user interface, not shown in FIG. 1. For each of core classes 101, 102 and 103, a so-called corresponding "plugin" performs the actual functionality. Each of core classes 101, 102 and 103 performs control and management of its corresponding plugin. A "plugin" is a unit of program code that can be integrated into another program and executed from that program without requiring the recompilation of either the program or the unit of code representing the plugin. The integration of the plugin into the other program only requires the specification of the name of the plugin such that the program can identify the plugin to integrate it. As indicated below, a plugin does not have to be a final or end class with no further derived classes, i.e., child, grandchild, etc. Thus, as shown in FIG. 1, the plugin classes include at least base classes, namely, FIBase 105, WGBase 106 and DCBase 107, any corresponding intermediate classes 108, 109 and 110, and any corresponding so-called end classes, namely, FIEnd 111, WGEnd 112 and DCEnd 113, respectively. That is, each plugin includes at least a base class and may possibly include hierarchical custom derived classes. Note that the plugins allow any class that conforms to the interface for that plugin to be dynamically linked to the corresponding core class. By way of an example and described below, the WGBase 106 class includes two required processes, namely, runWorkload( ) and stopWorkload( ). Consequently, a plugin for the WG class must implement these two methods. In turn, this provides the flexibility to incorporate a wide range of fault injection, workload generation, and data collection methods in the fault injection tool. Hierarchical, custom derived plugin classes include the intermediate classes, in this example, 108, 109 and 110, and any end classes, in this example, FIEnd 111, WGEnd 112 and DCEnd 113. They facilitate program software reuse and simplify the task of creating plugins. Indeed, many of the actions that must be performed in a plugin are identical or substantially similar for a wide range of fault injection, workload generation and data collection processes. These identical or similar actions are implemented in abstract base classes. For example, a Java abstract class is a class that serves a parent class and that can only be used to derive child classes from the parent. Custom Classes are derived from these base classes, and the objects that are instantiated from the derived custom classes are the actual plugins that are linked to core objects. These custom classes can be created in a hierarchical manner. For example, intermediate classes 108, 109 and 110, can be derived from base classes FIBase 105, WGBase 106 and DCBase 107, respectively. Similarly, the final end classes, i.e., objects from which plugins are instantiated, namely, FIEnd 111, WGEnd 112 and DCEnd 113 can be derived from the intermediate classes 108, 109 and 110, respectively. This hierarchical architecture can be extremely helpful in organizing WG classes that create workloads based on specific so-called middleware. Intermediate classes are created for several middleware software packages. For each intermediate class, an end class is derived for each application that uses that particular middleware software. Each of the intermediate classes contains the program code to properly use the middleware, and the associated end class contains the program code to properly use the application.

For further details regarding the Java programming language and its terms, see for example, a book authored by Bruce Eckel, entitled "Thinking in Java: The definitive Introduction to Object-Oriented Programming in the Language of the World-Wide Web", Prentice Hall PTR, Upper Saddle River, N.J., 1998.

Figure 2A:
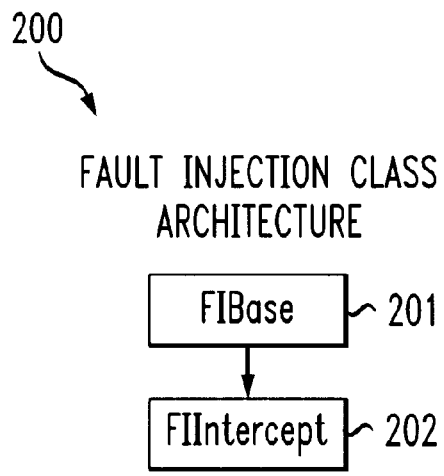
FIG. 2A shows, in simplified form, details of a fault injection class architecture that may be employed in practicing the invention.

FIG. 2A shows, in simplified form, details of a particular fault injection class architecture 200 that may be employed in practicing the invention. Specifically, shown are FIBase 201 and FIInterceptor 202, where "FI" is Fault Injector. FIBase 201 has been described above and FI will be described in further detail below. It is noted that this particular implementation of the fault injection tool of this invention is based on the interception of system calls and corruption of system call parameters. However, it should be noted that other fault injection techniques may be employed.

Figure 2B:
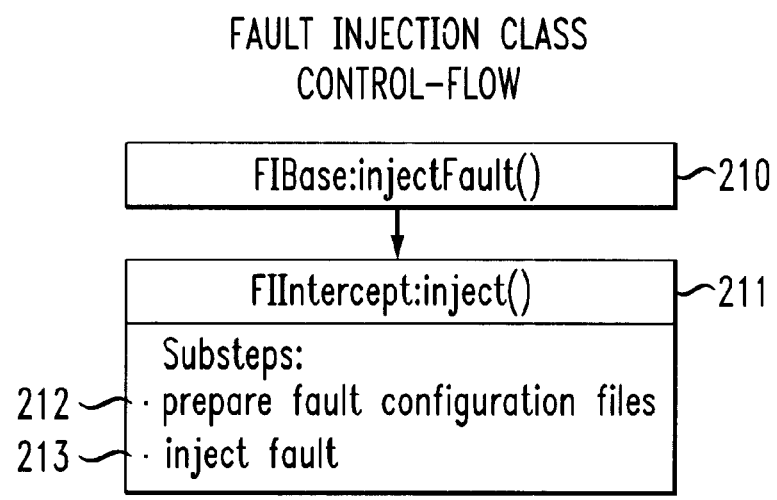
FIG. 2B shows, in simplified form, a control flow diagram illustrating the process of the fault injection class architecture of FIG. 2A.

FIG. 2B shows, in simplified form, a control flow diagram illustrating the process of the fault injection class architecture of FIG. 2A. Thus, shown are FIBase:injectFault( ) step 210 and FIIntercept:inject( ) step 211. Steps 210 and 211 cause the fault to be controllably injected during the execution of prescribed target programs. To this end, step 211 includes substeps 212 that prepares in a prescribed fashion fault configuration files and 213 that causes the fault to be injected into the target program during its execution.

Figure 3A:
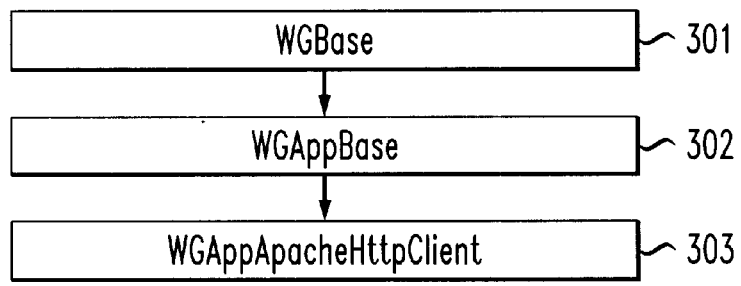
FIG. 3A shows, in simplified form, details of a workload generator class architecture that may be employed in practicing the invention.

FIG. 3A shows, in simplified form, details of a workload generator (WG) class architecture that may be employed in practicing the invention. As described in more detail below, the WG object determines what programs need to be started on the target machine to create the desired workload. The WG object may be implemented as a WG/WGRemote pair and, then, the WG object doesn't actually start the workload programs, but rather sends messages to a WGRemote object, which actually starts the workload programs. The workload is the combined system resource usage, e.g., usage of operating system data structures, communication ports, etc., caused by the execution of the application programs, the fault tolerance middleware, and the operating system. A workload generator is a set of programs that initiate the programs and creates the program inputs and environments in a controlled and reproducible manner to generate a particular workload.

Thus, shown in FIG.3A are WGBase 301, described above, WGAppBase 302, which is an intermediate class for this specific application, and WGAppApacheHttpClient 303, where in this application a WG object sends commands to a WGRemote object to start an Apache web server along with a client program that sends a sequence of HTTP requests to the web server. The WG and WGRemote objects and the Apache web server and client programs constitute the workload generator, which is further described below.

Figure 3C:
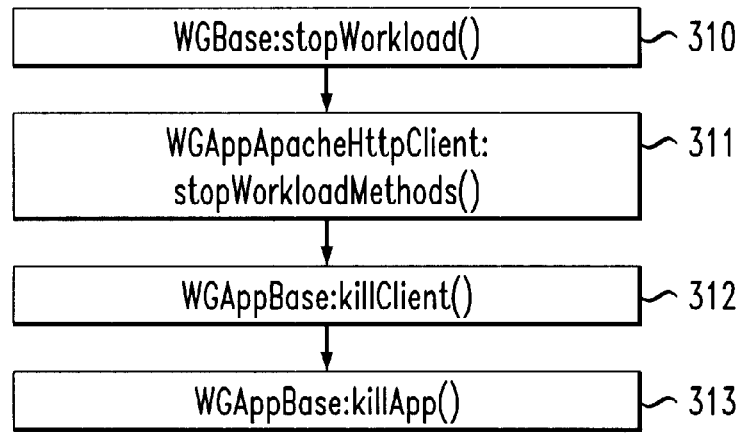
FIG. 3C shows, in simplified form, a control flow diagram illustrating the process for stopping the workload process for the WGBASE of FIG. 3A.
Figure 3B:
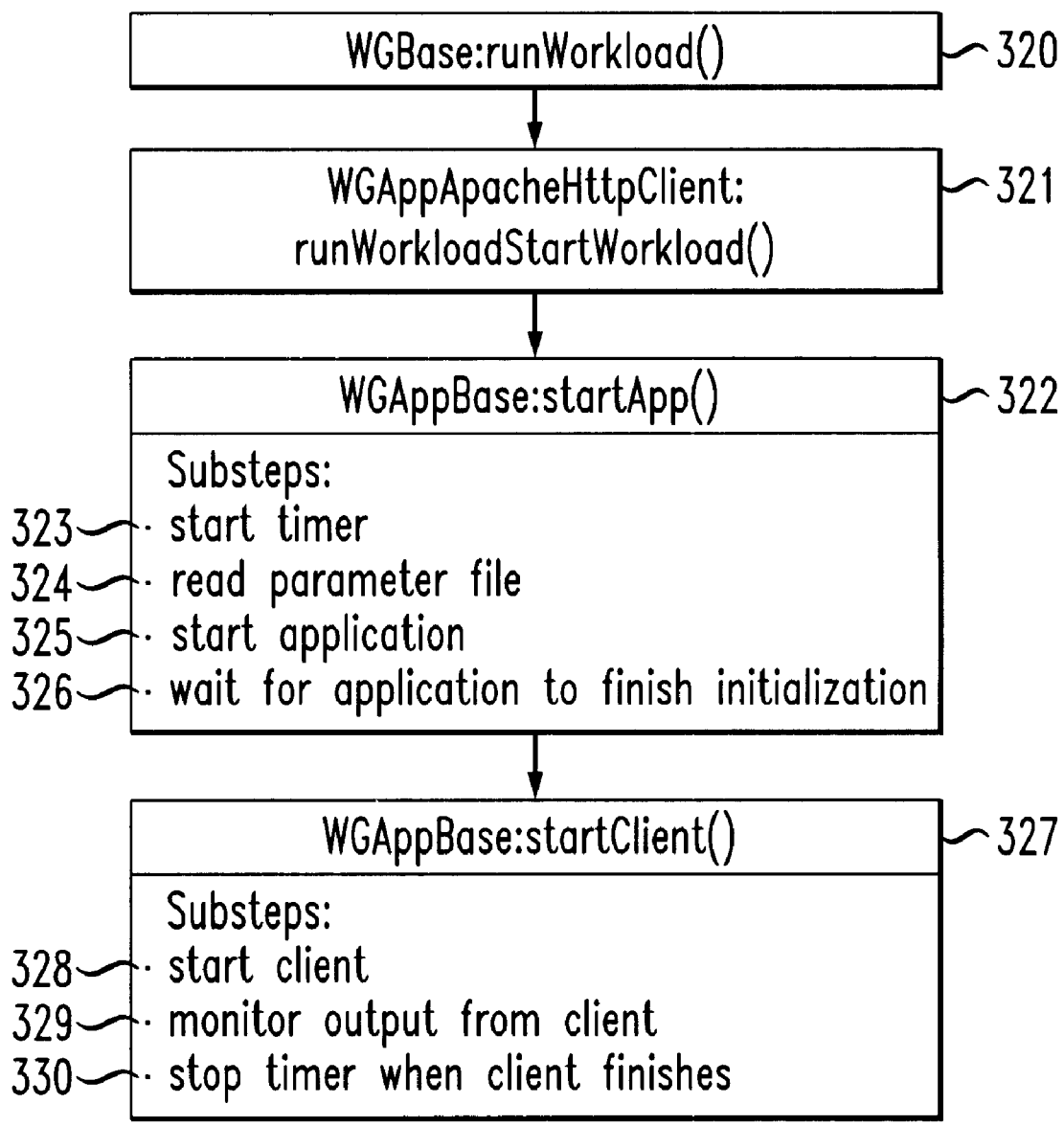
FIG. 3B shows, in simplified form, a control flow diagram illustrating the process for running the workload process for the WGBASE of FIG. 3A.

FIG. 3B shows, in simplified form, a control flow diagram illustrating the process for running the workload process for the WGBASE of FIG. 3A. Specifically, shown is step 320, namely, WGBase:runWorkload( ), which includes the program code for the preparation of the workload. WGAppApacheHttpClient:runWorkloadstart Workload( ) step 321 includes the program code to call WGAppBase:startApp( ) and WGBase:startClient( ) step 328. WGAppBase:startApp( ) step 322 includes the program code that directly starts the application processes and includes substeps start timer 323 that causes an application timer to begin, read parameter file 324 to obtain the parameters for this specific workload, start application 325 and wait for application to finish initialization 326. The application timer determines the time from the start of the application to the termination of the application. WGAppBase:startClient( ) step 327 initiates the client for the workload and includes substeps start client 328, monitor output from client 329 and stop timer when client finishes 330.

FIG. 3C shows, in simplified form, a control flow diagram illustrating the process for stopping the workload process for the WGBASE of FIG. 3A. Specifically, shown are steps 310, namely, WGBase:stopWorkload( ) that is used to interrupt the execution of processes that are started by the runWorkload( ) method and to terminate the workload, WGAppApacheHttpClient:stopWorkloadMethods( ) 311, which is called by runWorkload( ) and is the method for effecting stopWorkload( ) for this specific workload WGAppBase:killClient( ) 312, which is called stopWorkloadMethods( ) and which causes the client processes to be terminated for this specific workload, and WGAppBase:killApp( ), which is called by stopWorkload Method( ) and which causes the application processes for the specific workload to be terminated.

Figure 4A:
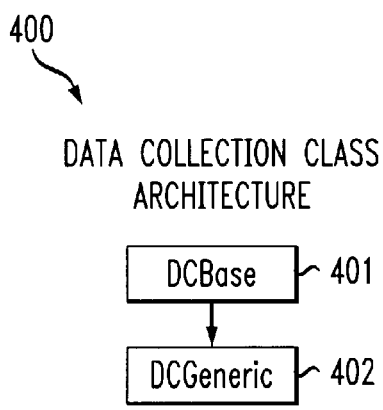
FIG. 4A shows, in simplified form, details of a data collection class architecture that may be employed in practicing the invention.

FIG. 4A shows, in simplified form, details of a data collection class architecture that may be employed in practicing the invention. Specifically, shown are DCBase 401 that contains most of the program code for gathering results and DCGeneric 402 that contains program code to activate the code in DCBase. DCGneric 402 may also conatin code for manipulating results into a form that is compatible with the code in DCBase.

Figure 4B:
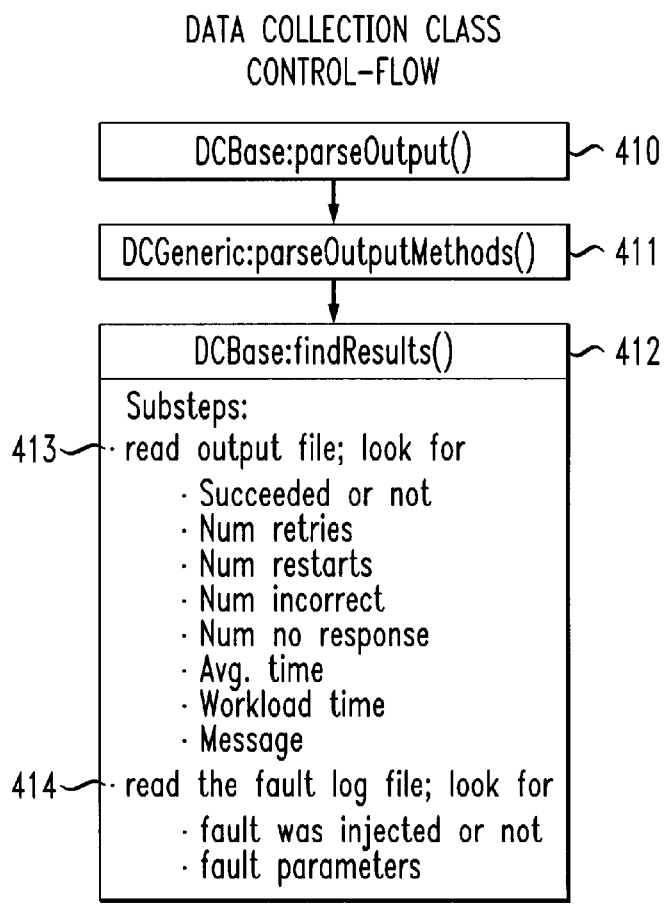
FIG. 4B shows, in simplified form, a control flow diagram illustrating the process of the data collection class architecture of FIG. 4A.

FIG. 4B shows, in simplified form, a control flow diagram illustrating the process of the data collection class architecture of FIG. 4A. Specifically, shown is step 410, namely, DCBase:parseOutput( ), which is invoked when the workload has completely finished. This method will examine the output files produced by the workload, along with the machine state to determine the results of the fault injection run. DCGeneric:parseOutputMethods( ) step 411 includes the program code to activate the code in DCBase, specifically, DCBase:findResults( ). DCGeneric may also contain code for manilulating results into a form that is compatible with the code in DCBase before calling DCBase:findResult( ). DCBase:findResults( ) step 412 obtains the fault injection run results, and includes substeps read output file 413; look for if the fault injection run succeeded or not, number of retires of fault injection run, number of restarts, number of incorrect, number of no response, average time of run, workload time and message, and read the fault log file 414; look for whether fault was injected or not and fault parameters.

Figure 5:
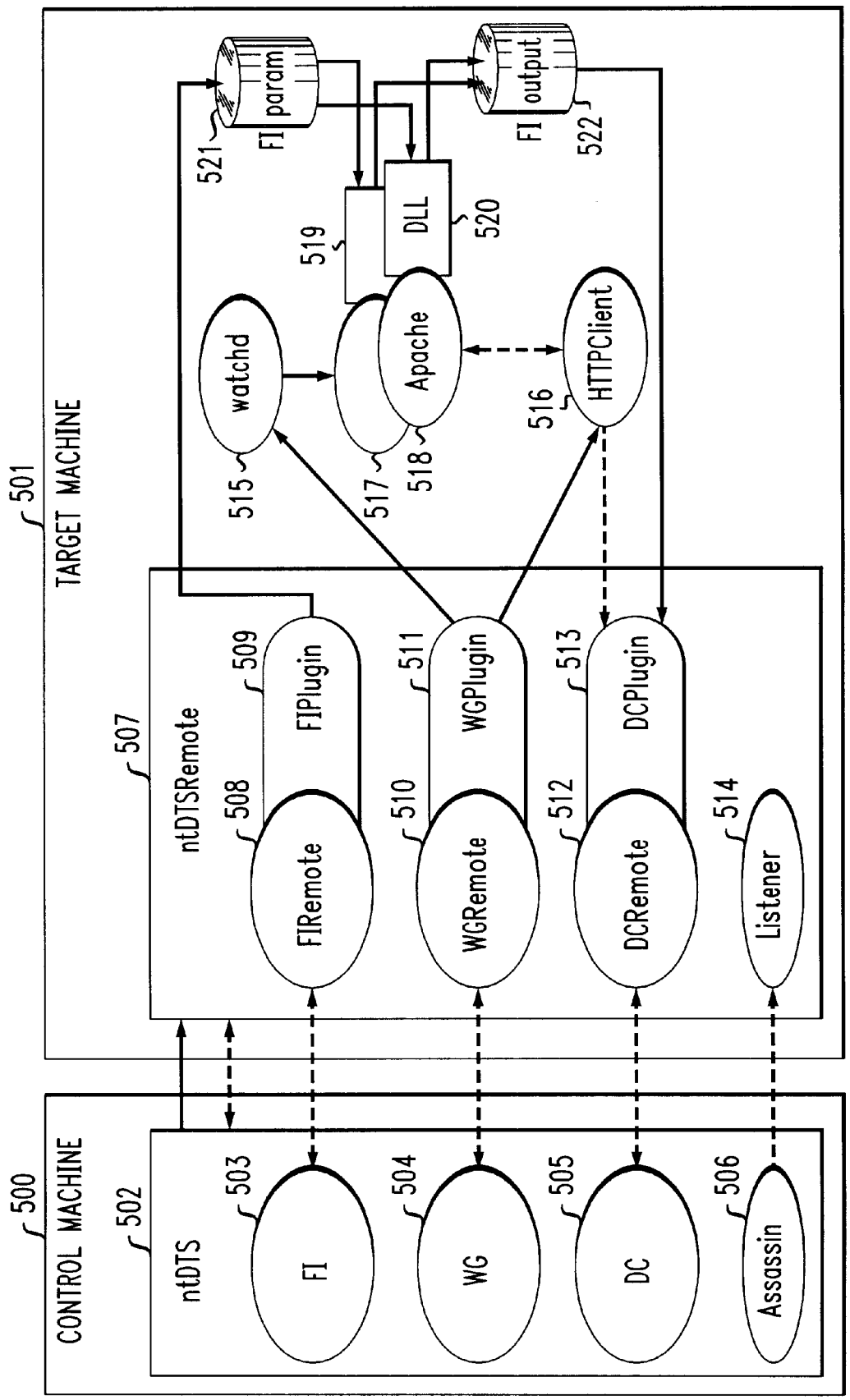
FIG. 5 shows, in simplified form, details of a fault injector tool architecture including a particular embodiment of the invention.

FIG. 5 shows, in simplified form, details of a fault injector tool architecture including a particular embodiment of the invention. Specifically, shown is a particular embodiment of the invention to be used in conjunction with the Microsoft Windows NT operating system and an Apache web server. It will be apparent to those skilled in the art that the invention is equally applicable to other operating systems and applications. Thus, shown in FIG. 5 is a Microsoft Windows NT Dependability Test Suite (ntDTS) fault injection tool, in accordance with the invention, for testing the error and failure detection and recovery functionally of an application server, in this example, an Apache web server.

The basic ntDTS architecture is not dependent on a particular fault injection mechanism. However, the initial ntDTS fault injection tool implementation is based on the interception of system calls and corruption of system call parameters. It should be noted that this fault injection technique injects faults during the execution of the target programs and, therefore, is very different from mutation testing, which injects faults into source code before compilation and is intended for software test case evaluation.

The main goals in designing the ntDTS fault injection tool were ease of use, automation, extensibility, and most importantly, the ability to produce useful results.

The architecture of the ntDTS fault injection tool is shown in FIG. 5. The fault injection tool is distributed with the management and user interface software residing on the control machine 500 and the fault injection mechanism, workload generator, and data collector present on a separate target machine 501. This separation of the control and target machines is necessary if there is a possibility of a machine crash caused by an injected fault. Otherwise, a machine crash would require human intervention to restart the testing process. In addition, a distributed design allows for testing of distributed systems, especially if failover may occur or if correlated faults on multiple machines are to be injected. Nonetheless, even though the fault injection tool is distributed in nature, it may be used with all components on a single machine if none of the above issues are applicable. If all components reside on a single machine, then the FI/FIRemote, WG/WGRemote and DC/DcRemote pairs in FIG. 1 and FIG. 5 can be merged in single FI, WG and DC objects, the functionality of the ntDTSRemote object can be merged in ntDTS 502 object and the ntDTSRemote object can be omitted.

Specifically, control machine 500 includes ntDTS 502, fault injector (FI) 503, workload generator (WG) 504, data collector (DC) 505 and Assassin 506. Details of FI 503, WG 504, DC 505 and Assassin 506 are described below.

Target machine 501 includes ntDTSRemote 507 includes FIRemote 508, associated FIPlugin 509, WGRemote 510, associated WGPlugin 511, DCRemote 512, associated DCPlugin 513 and listener 514, details of which are described below. Also included in target machine 501 are watchd process 515 that transparently monitors the functionality of objects, HttpClient 516, one or more Apache web servers 517 and 518 and associated dynamically linked libraries (DLL) 519 and 520, respectively, FI parameters files 521 and FI output files 522. HttpClient 516 sends HTTP requests to an associated one of the Apache web servers and determines the correctness of the responses from the associated Apache web server. Note that the arrows in dashed outline indicate communications and the double arrow heads indicate bidirectional communications, the bold solid arrows indicate that a new process is started and the thin solid arrows indicate file input/output. Although an Apache web server(s) is employed in this embodiment other web servers may be also employed, for example, Microsoft IIS.

The majority of the ntDTS code is written in the Java ™ programming language. The Java language includes many features that facilitate fast code development. These features include socket creation and use, thread management, object-oriented software reuse, convenient graphical libraries, and portability. The small portion of the code that could not be implemented in Java utilizes the Java Native Interface (JNI).

ntDTS is controlled via a graphical interface and a few configuration files. One main configuration file is used to specify test parameters such as timeout periods, a fault list file name, and workload parameters. The fault list file contains a list of faults to be injected. Workloads are specified by creating parameter files with names of applications or services to execute or by creating Java classes that are used by the ntDTS workload generator. Detailed information about the steps needed to configure and use the fault injection tool is described below.

ntDTS Components

The basic architecture of ntDTS is shown in FIG. 5. As mentioned previously, the fault injection tool code is distributed between the control machine 500 and the target machine 501, although a single machine may serve as both the control machine and the target machine in some cases. The control machine 500 provides management and user interface capabilities. The target machine 501 is the machine to be injected with faults. It is the effect of the injected faults on the target machine 501 that is the focus of the entire fault injection process.

All components described here are objects that are instantiated from the corresponding Java classes. The ntDTS object 502 is the main object from which all other objects are started. It executes in a Java virtual machine on the control machine and instantiates the FI 503, WG 504, DC 505, and Assassin 506 objects, as well as the ntDTSRemote 507 object. The ntDTSRemote 507 object executes in a separate Java virtual machine on the target machine 501 and instantiates the FIRemote 508, WGRemote 510, DCRemote 512, and Listener 514 objects. As seen in FIG. 5, the FIRemote 508, WGRemote 510, DCRemote 512, and Listener 514 objects only communicate with their corresponding counterparts on the control machine 500. The communication between the control machine objects and the target machine objects is conducted via sockets.

All ntDTS objects execute in independent threads of execution. This asynchronous nature of execution necessitates a synchronization mechanism for certain tasks. For instance, the result gathering task of the DCRemote 512 object cannot begin until the workload generated by the WGRemote 510 object has finished. Semaphore objects are provided to allow for synchronization among the ntDTS objects.

Most of the ntDTS objects are instantiated based on the default Java classes provided by the ntDTS fault injection tool package. However, a few Java classes must be written separately for different systems, in particular, the WGRemote 510 and DCRemote 512 objects. These classes are written as plugins, shown as FIPlugin 509, WGPlugin 511, and DCPlugin 513, to allow custom classes to be easily integrated. More information on plugins is described below. Fortunately, most of the functionality of these classes is identical for most usage scenarios. To take advantage of this commonality, Java base and generic classes are provided as part of the ntDTS fault injection tool package. The use of these provided classes reduces the task of writing the WGRemote 510 and DCRemote 512 objects to writing a few lines of code.

ntDTS

The two main responsibilities of the ntDTS 502 object are (1) to manage the creation of objects for each new fault, and (2) to provide the graphical user interface.

The ntDTS 502 object serves as the starting point for all objects. The entire fault injection tool is started by instantiating the ntDTS 502 object. The ntDTS 502 object then instantiates the FI 503, WG 504, DC 505, and Assassin 506 objects and also instantiates the ntDTSRemote 507 object in a new Java virtual machine on the target machine 501. For each new fault that is injected, a new set of FI 503, WG 504, DC 505, Assassin 506, and ntDTSRemote 507 objects are created to ensure that the previously injected fault does not affect future fault injections. A graphical user interface is described below.

FI (Fault Injector)

The FI 503 object determines the parameters for the fault to be injected and sends messages to the FIRemote 508 object, which actually injects the fault.

The fault that is injected is perhaps more accurately described as an error. An error is that part of the system state which is liable to lead to subsequent failure. A failure occurs when a delivered service no longer complies with the specification. One example of a fault is an incorrectly coded statement in the operating system. If this part of the program code is executed and causes corruption of an operating system data structure, then an error has occurred. If that error causes the operating system to crash, a failure results.

The behavior of a computer system is determined largely by its state and the effect of inputs on that state. Either direct alteration of the system state, i.e., introducing an error, or injection of the original fault achieves the same error propagation and triggering of error detection and recovery actions. The introduction of many types of errors can be performed completely with software, which facilitates automation, increases portability, and decreases the dollar cost of the fault injection tool. The ntDTS fault injection tool is designed to support software-implemented fault injection processes that emulate the injection of faults by directly introducing errors into the target system.

This fault injection mechanism corrupts parameters of system calls. The resulting errors emulate the effects of several different types of faults, including application design and coding defects and unintended interactions of the application with the environment and non-standard input.

WG (Workload Generator)

The WG 504 object determines what programs need to be started on the target machine to create the desired workload. The WG 504 object doesn't actually start the workload programs, but rather sends messages to the WGRemote 510 object, which actually starts the workload programs.

The workload is the combined system resource usage (e.g., usage of operating system data structures, communication ports, etc.) caused by the execution of the application programs, the fault tolerance middleware, and the operating system. A workload generator is a set of programs that initiate the programs and creates the program inputs and environments in a controlled and reproducible manner to generate a particular workload. For example, the WG 504 object sends commands to the WGRemote 510 object to start the Apache 518 or 519 web server along with a client program that sends a sequence of HTTP via 516 requests to the web server. The WG 504 and WGRemote 510 objects and the Apache 518 or 519 web server and client programs (HttpClient 516) constitute the workload generator, and the resulting workload includes the usage of CPU cycles and registers, memory, disk, communication ports, operating system objects, etc.

The workload is usually assumed to be created by a client-server set of programs. This assumption is valid for most applications of interest because reliability concerns are particularly important for server programs. Other types of workload scenarios are also supported by ntDTS, including applications with direct user interaction. However, some additional coding of Java classes may be necessary. More information on the creation of workloads is described below. The server program is also referred to as the "target program" because the focus of the fault injections is to evaluate the reliability of the server program, in the context of the operating system, fault tolerance middleware, and the client program.

DC (Data Collector)

The DC 505 object listens for the results of the fault injection from the DCRemote 512 object. These results include the following:

Outcome: The outcome for each injected fault is one of the following:
1. Normal success: The server was able to provide correct responses to all requests without any server restarts or request retransmission.
2. Server restart with success: After a restart of the server, the server provided a correct response.
3. Server restart and client request retry with success: After a restart of the server and the retransmission of at least one client request, the server provided a correct response.
4. Client request retry with success: After at least one client request was retransmitted, the server provided a correct response.
5. Complete failure: At least one of the client requests did not succeed, either because no response was received or an incorrect response was received.

Response time: The total time starting with the creation of the FI, WG, and DC objects until these three objects have finished or the Assassin 506 object has determined that there is a hang.

Detailed results: The specific response to each individual request.

The results are displayed in the graphical user interface and also stored in a log file.

Assassin

The Assassin 506 object provides a mechanism to detect situations in which an injected fault has caused the workload on the target machine to hang. The Assassin 506 object is instantiated with a fixed timeout period, which begins immediately before the FI 503, WG 504, and DC 505 objects are created. If the timeout period expires before the FI 503, WG 504, and DC 505 objects finish, then a hang of the target machine workload is assumed. The Assassin 506 object does not actually kill any objects or processes. Rather, upon determination of a hang, it sends a "STOP" message to the Listener 514 object, which in turn invokes the forceStop( ) method in the FIRemote 508, WGRemote 510, and DCRemote 512 objects. The forceStop( ) method interrupts the execution of the workload, terminates the workload, and forces FIRemote 508, WGRemote 510 and DCRemote 512 objects to exit gracefully. More details on the stopWorkload( ) process are described below.

Note that the client program affects the overall reliability of the client-server system because client-initiated actions, such as client request retries, may be required for correct operation in the presence of faults.

ntDTSRemote

Because the control machine and the target machine can potentially be separate machines, the ntDTS 502 and ntDTSRemote 507 objects must be created in separate Java virtual machines on the control machine and the target machine. The ntDTS 502 object uses the rsh command to start the Java virtual machine on the target machine.

The main purpose of the ntDTSRemote 507 object is to create and manage the three *Remote objects. After creating the *Remote objects, it creates the Listener 514 object and then waits for all child objects to finish.

FIRemote

The architecture of ntDTS can support multiple fault injection mechanisms. However, this embodiment of the invention assumes a fault injection mechanism based on interception of system calls and corruption of system call parameters. This fault injection mechanism is described in detail below. For this particular fault injection mechanism, the only work the FIRemote 508 object needs to do is to create a fault parameter file that is used when the workload is started.

WGRemote

The WGRemote 510 object is the most complicated object in the current implementation of the fault injection tool. The following tasks must be performed by the WGRemote 510 object:

Preparation: Delete all parameter and output files from the previous fault injection run and create new parameter files. A fault injection run consists of all the tasks associated with the fault injection, workload generation, and results gathering for the injection of one fault.

Execution: Start the workload programs in order. The server program is started first, followed by the client program. Some minimum criteria for determining that the server program has been started must be fulfilled before the client program can be started. If additional middleware software, such as for fault tolerance, is intended to be part of the workload, then it must be started at the appropriate time.

Termination: Terminate all workload programs, including any middleware software, in a manner that allows the results of the workload programs to be gathered by the DCRemote 512 object. This means that the DCRemote 512 object must be customized based on the WGRemote 510 object.

The WGRemote 510 class, upon which the WGRemote 510 object is instantiated, must be customized for each workload. This means that a new Java *class file must be written for each new workload type. A workload type is determined by the set of programs for that particular workload. These programs include the server, client, and middleware programs. If any of these programs change, then a new WGRemote 510 class file must be written for the new workload type.

For many workload types, the process of writing a new WGRemote 510 class file is very simple. Because Java is an object-oriented language, customized WGRemote class files can be derived from base classes that are provided as part of the fault injection tool package. The derived classes can often be shorter than ten lines of code. Also, generic classes are provided as part of the fault injection tool package. The generic classes generate workloads based on workload parameter files, which can be as short as five lines. The actual steps needed to create WGRemote class files are described below.

DCRemote

The DCRemote 512 object is responsible for gathering up results of each fault injection run after the workload has been completed or the Assassin 506 object has determined that a hang has occurred. The results that need to be gathered are listed below. These results are sent to the DC 505 object.

Most of the results are client-oriented, which means that most of the results can be determined by examining the client program behavior. Usually, the client program is a synthetic program that is specifically written for ntDTS. For the embodiment shown in FIG. 5, the client program is HttpClient 516. The client program is started by the WGRemote 510 object and, therefore, the WGRemote 510 object must be written to capture the standard output stream from the client program to an intermediate file, or the client program must write its output directly to an intermediate file. In either case, the DCRemote 512 object will read the intermediate file to determine the client-oriented results.

Some results, such as whether the server program has been restarted, cannot be determined from examining the client program output. The determination of server program restarts is dependent on the middleware used to perform the restart. Some middleware, such as Microsoft Cluster Server, write output to the Windows NT event log. Other middleware, such as NT-SwiFT, create a separate log file.

Listener

The sole purpose of the Listener 514 object is to listen for the "STOP" message from the Assassin 506. The Assassin 506 cannot directly call the forceStop( ) methods in the *Remote objects because the Assassin 506 object exists in a different Java virtual machine. The Listener object allows the Assassin 506 object to send a single "STOP" message instead of individual messages to each of the *Remote objects.

Steps for User Operation

The graphical user interface displays information about ongoing fault injection runs, as well as, parameters and results. Once the parameter files have been created, the user only has to load the main parameter file and click the "GO" button. The fault injection tool will then perform all fault injection runs and display the results.

Figure 6A:
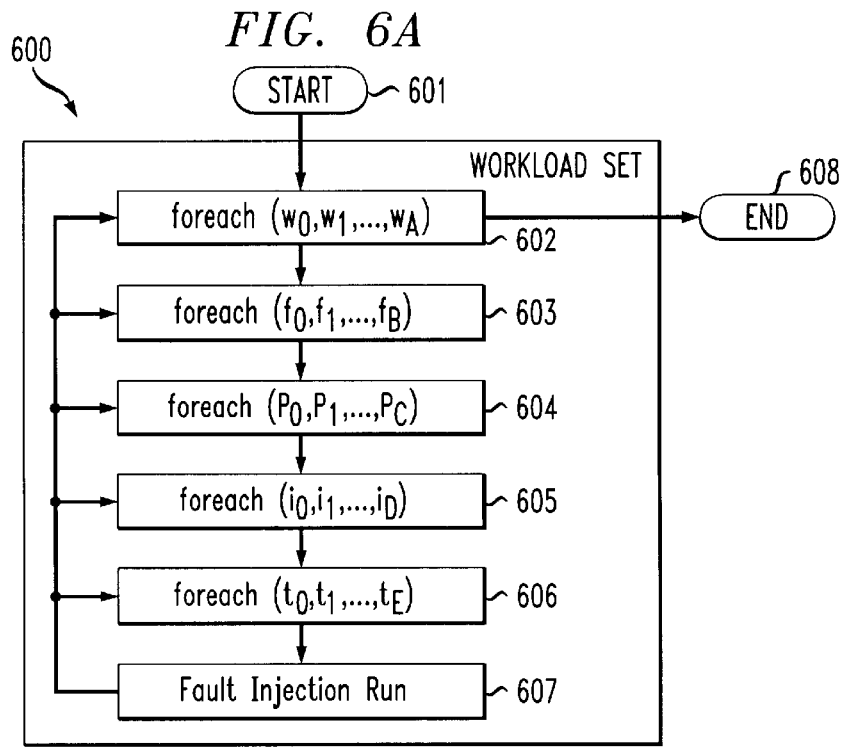
FIG. 6A is a flow diagram illustrating the fault injection process employing the embodiment of the invention of FIG. 5.

FIG. 6A shows the sequence of actions performed by the ntDTS fault injection tool in one example. The example, includes a series of workload sets. Each workload set consists of a set of fault injection runs. A fault injection run includes the actions associated with a single fault injection. As seen in FIG. 6A, a fault injection run consists of actions by the FI 503, WG 504, and DC 505 objects (as well as their *Remote counterparts). For each workload, a set of faults is injected. The set of faults depends on the set of functions to inject (F), the number of parameters for a particular function (P), the number of iterations to inject per function (I), and the number of fault types (T).

Specifically, shown in FIG. 6A is the fault injection process beginning with step 601, which starts the process. Then, steps 602 through 607 cause a fault injection run to be effected for each workload $w_0$ through $w_A$, where A may be an integer equal to or greater than zero (0), for each function $f_0$ through $f_B$, where B is an integer equal to or greater than zero (0), for each parameter $p_0$ through $p_C$, where C is an integer equal to or greater than zero (0), for each iteration $i_0$ through $i_D$, where D is an integer equal to or greater than zero (0) and for each fault type $t_0$ through $t_E$, where E is an integer equal to or greater than zero (0), until the last workload has been reached. The functions are the functions contained in the DLL (dynamically linked libraries) used by the target program. An iteration of a function occurs when a function is invoked once; for example, the Nth iteration of a function is the Nth time it is invoked by the target program. The fault type describes the specific type of fault that is injected; examples of the fault types are given below. Thereafter, step 608 causes the processes to end.

Figure 6B:
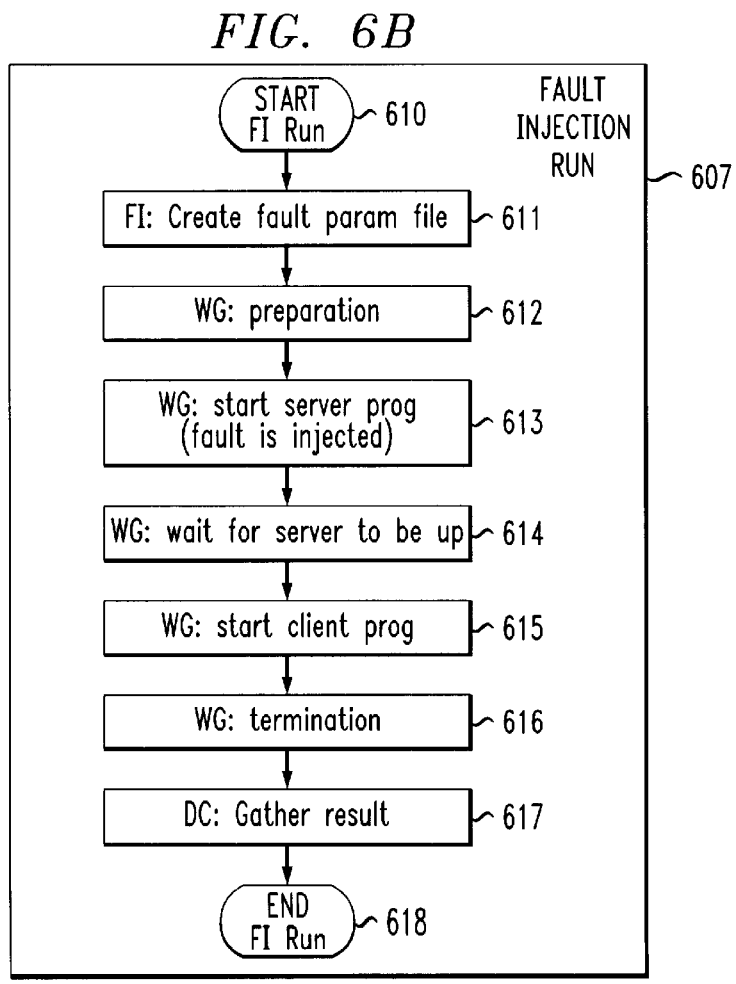
FIG. 6B is a flow diagram illustrating the fault injection run process employed in the flow diagram of FIG. 6A.

FIG. 6B is a flow diagram illustrating the fault injection run 607 process employed in the flow diagram of FIG. 6A. Specifically, the fault injection run is started in step 610. Then, step 611 causes a fault parameter file for the FI to be created. Step 612 prepares the workload generator, i.e., initializes, and cleans files. Step 613 causes the server program, in this example, the Apache web server, to be started, which causes the fault to be injected. Step 614 causes the WG to wait for the server program to be up. Step 615 causes the client program, in this example, HttpClient, to be started for the WG. Step 616 causes the termination of the WG. Step 617 gathers the fault injection run results in the DC. Thereafter, the FI run in ended via step 618.

Graphical User Interface

Figure 7:
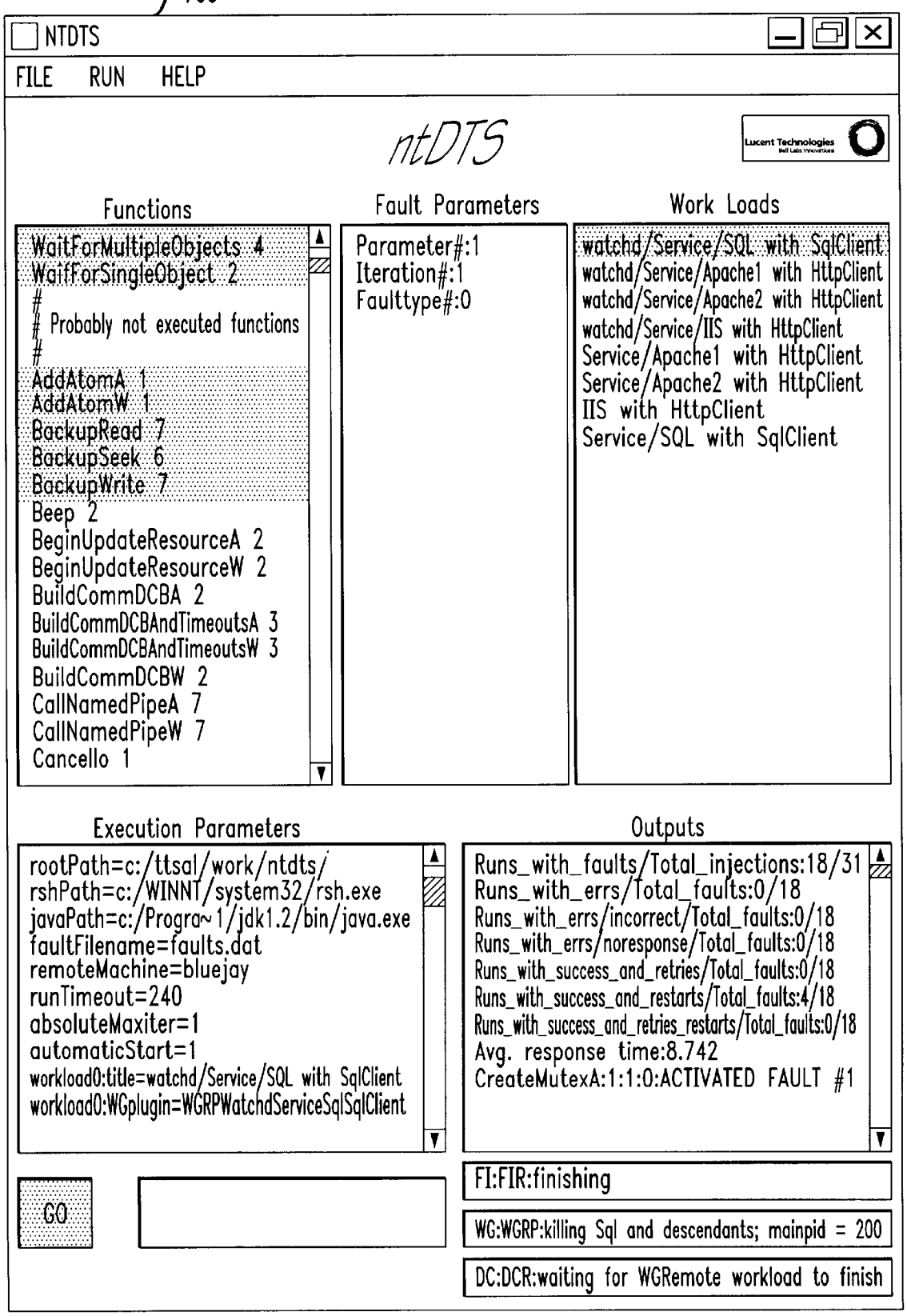
FIG. 7 shows a display illustration of a graphical user interface employed in the embodiment of the invention of FIG. 5.

The ntDTS graphical user interface presents the user with a display of all fault injection runs, including configuration, status, and results. FIG. 7 shows a snapshot of the interface 700. The three windows near the top indicate the parameters for the current fault injection. The first window labeled "Functions" lists all functions that are to be injected. The number following each function is the number of parameters for that function. As each function is processed, that function is shown in inverse highlighting. Blank lines and lines starting with "#" are ignored.

For each function, several faults may be injected. The middle window labeled "Fault Parameters" shows the fault parameters for the current function. The "Parameter" field indicates which function parameter is being injected, the "Iteration" field shows which invocation of the function will be injected (e.g., the first, second, etc. time the function is called), and the "Fault type #" field shows the type of fault to be injected for the function parameter. The fault type number can be 0 (all bits in parameter are reset to zero), 1 (all bits in parameter are set to one), or 2 (all bits in parameter are XOR'ed with 0×1).

The window on the right that is labeled "Workloads" contains a list of all workloads that will be executed with each fault. The text associated with each workload is specified in the configuration file and can be any arbitrary text string. The line associated with the currently executing workload is indicated by inverse highlighting.

The bottom-left window labeled "Execution Parameters" displays the main configuration parameters as specified by the main configuration file. This main configuration file is described below.

The bottom-right window labeled "Outputs" shows results for all fault injection runs associated with the current workload. These results are saved to a file after the completion of each fault injection run. When all faults for a specific workload have been injected, the contents of the "Outputs" window are saved to the file, and the window is cleared in preparation for the next workload. The first eight lines of the window contain summary totals for the faults associated with the current workload. These totals are updated after each fault. The "Total_injections" field shows the number of faults that have been injected. Because not all injected faults are guaranteed to be activated, the "Runs$_{13}$ with$_{13}$ faults" field displays the number of faults that were actually activated. Fault activation means that the function associated with the fault was actually called as a result of the executing workload. The "Runs$_{13}$ with$_{13}$ errs" field shows how many runs have resulted in an erroneous result. An erroneous result may consist of a response from the server program that was incorrect (shown in the "Runs$_{13}$ with$_{13}$ errs$_{13}$ incorrect" field) or no response at all from the server program (shown in the "Runs$_{13}$ with$_{13}$ errs$_{13}$ noresponse" field). If the run resulted in a correct response and (1) a request retry, (2) a server restart, or (3) both were required to produce the correct response, then that run increments the totals in the "Runs$_{13}$ with$_{13}$ success$_{13}$ and $_{13}$ retries," "Runs$_{13}$ with$_{13}$ success$_{13}$ and$_{13}$ restarts," and "Runs$_{13}$ with_success$_{13}$ and $_{13}$ retries_restarts" fields, respectively. The three unlabeled windows beneath the "Outputs" window display status messages from the FI, WG, and DC objects, and the unlabeled window beneath the "Execution Parameters" window displays warning and error messages.

Parameter Files

Two types of parameter files are needed to perform fault injection with ntDTS: (1) the fault list file and (2) the main configuration file. The fault list file contains the list of functions to be injected. This list is displayed in the "Functions" windows of the graphical interface. Blank lines and lines starting with '#' are ignored. Each function is listed on a separate line. The function name is listed first, followed by the number of parameters for that function, followed by two optional parameters: (1) The maximum number of iterations for that function, and (2) the maximum number of fault types for that function.

The main configuration file contains the settings for all fault injection tool parameters, including the name of the fault list file. The parameters in the main configuration file are listed in Table 1, of FIG. 8. As shown in Table 1, some parameters are required. Parameters that are not required have default values.

The rootpath, rshpath, and JavaPath parameters specify needed paths and directories for the top-most ntDTS directory, the rsh command, and the Java command. The faultFilename is the name of the global fault list file. By default, the global fault list file is used, unless a workload specific fault list file is specified for a particular workload. The remoteMachine is the name of the target machine, which may be the same as the control machine. An injected fault may cause the workload on the target machine to hang and produce no response. The runTimeout is the number of seconds that the Assassin 506 object will wait before determining that the target machine workload is hung. Usually, only the first invocation of each function is injected. However, subsequent invocations may also be injected by increasing the absoluteMaxiter parameter. If the name of the main configuration file is specified on the command-line and the automaticStart parameter is nonzero, then the fault injections will commence immediately. Otherwise, the user must click the "GO" button in the graphical user interface to start the injections.

A list of workloads is required. This list must appear in the main configuration file along with the other parameters. This list may contain one or more workloads. The parameters for each workload are listed in Table 2 of FIG. 9. The title is an arbitrary string that will be displayed in the "Workloads" window of the graphical interface. The faultFilename is an optional parameter. If it is specified, then it will be used in place of the globally specified faultFilename. The WGplugin 511 (FIG. 5) and DCplugin 513 parameters are names of Java classes that perform the actual work of the WG and DC objects. The structure of these classes is described below. The savefile is the name of the file in which to save the results of all injections for this workload. Finally, the targetinv parameter specifies the specific process in a multi-process workload to inject. For example, the Apache web server always executes with at least two processes. Only one process will be injected. By default, the first process is injected, but the targetinv parameter may be used to cause the injection of the second process.

Java Plugin Classes

Support for Java plugin classes was added to maximize the ease of use of the *Remote objects while maintaining flexibility for customizing functionality. A plugin is a Java class that conforms to a specific interface and that can be dynamically invoked without recompiling the Java code that calls the plugin code. Any Java class may be used as a plugin class as long as it fits the template for the particular type of plugin. Because a plugin class conforms to the plugin template for the plugin type, the plugin can be dynamically invoked. The advantage of this approach is that plugins for all workloads can be prepared in advance and dynamically invoked by the ntDTS fault injection tool. The specific plugin to be invoked for a particular workload is specified as a WGplugin 511 or DCplugin 513 name in the main configuration file. The basic ntDTS fault injection tool code does not need to be recompiled to add additional plugin classes because the plugin class names are not explicitly compiled into the basic ntDTS fault injection tool classes.

The template for the WGplugin 511 class includes two required processes: runWorkload( ) and stopWorkload( ). The runWorkload( ) process includes the code for the preparation, execution, and normal termination of the workload. For most fault injection runs, it is the only WGplugin 511 method that is invoked. However, if the workload hangs, the forceStopo method is used to call the stopWorkload( ) method and to terminate the workload.

The template for the DCplugin 513 class only requires one method, parseOutput( ). This method is invoked when the workload has completely finished. The method will examine the output files produced by the workload, along with the machine state to determine the results of the fault injection run. These results are then sent to the DC 505 object, where they are compiled, saved to the output file, and displayed in the graphical user interface. The implementation of the DCplugin 513 class is directly related to the associated workload because the workload will produce workload-specific output that must be interpreted by the DCplugin 513 class. Thus, DCplugin 513 classes are always associated with particular workloads. However, it is possible for a set of multiple WGplugin 511 classes to produce workload output that is sufficiently similar to be interpreted by a single DCplugin 513 class.

Because many of the actions performed in the plugin processes are identical or very similar for many workloads, base and generic classes are provided as part of the ntDTS fault injection tool. Base classes are abstract Java classes that contain the required methods with partial implementations. The actions that are common for many workloads and, therefore, can be shared are implemented. The remaining actions are given as abstract methods that must be implemented in derived classes. For example, the base class for WGplugin 511 is WGRPBase.Java. WGRPBase.Java contains the runWorkload( ), forceStopo and stopWorkload( ) methods. The runWorkload( ) method first performs the needed workload preparation actions by deleting the appropriate configuration and log files that might remain from the previous fault injection run. The execution of the workload is different for each workload, so the workload execution action is given as the abstract runWorkloadStartWorkload( ) method, which must be implemented in a derived class. Finally, the runWorkload( ) method calls the stopWorkload( )method to terminate the workload. The stopWorkload( ) method performs two actions. First, it sets the earlyExit flag to notify runWorkload( ) that it should stop immediately. Then, runWorkload( ) must explicitly check the earlyExit flag and terminate prematurely if the earlyExit flag is set.

Next, stopworkload( ) calls the abstract stopWorkloadMethods( ) method, which is implemented in a derived class.

Derived classes may also serve as further base classes. For instance, workloads that are dependent on a particular fault tolerance middleware package can be derived from a common derived base class that includes the actions for starting the fault tolerance middleware. One of the main objectives in designing and using the ntDTS fault injection tool is to compare the Microsoft Cluster Server (MSCS) and watchd fault tolerance middleware packages. Thus, derived base classes were created for each of these packages. These derived base classes are called WGRPClusterServiceBase.Java and WGRPWatchdServiceBase.Java. These derived base classes configure MSCS and watchd to monitor the desired workload programs and then start the fault tolerance middleware and the workload programs. The final plugin classes are derived from these derived base classes. Because most of the workload actions have already been implemented in the base and derived base classes, the final plugin classes are very simple. FIG. 10 shows the complete program code for a sample final plugin class based on the WGRPClusterServiceBase.Java derived base class. The code is as follows:

```
import Java.io.*;
class WGRPClusterServiceApacheHttpClient extends
    WGRPClusterServiceBase{
  //Start workload methods
  public void runWorkloadStartWorkload( )
      throws IOException, InterruptedException
  {
    clusterGroupName="Apache-Group";
    serviceName="Apache";
    serviceMethodName="Apache";
    clientIsLocal=true;
    clientName="HttpClient";
    startService(clusterGroupName, serviceName,
        serviceProcessName);
    if (earlyExit) return;
    startClient( );
  }
  // Kill methods
  public void stopWorkloadMethods( ){
    killclient( );
    killService(clusterGroupName, serviceName,
        serviceProcessName);
  }
}
```

A sample configuration file for WGRPClusterServiceGeneric.Java is as follows:
clusterGroupName=Apache_Group;
servicename=Apache;
serviceProcessName=Apache;
clientIsLocal=true;
clientName=HttpClient;
remoteClient=????; # Commented out since clientIsLocal=true The main work performed by the final plugin class is the initialization of parameters that are needed by the base and derived base classes. To further simplify the creation of plugin classes, generic plugin classes have been created based on the base classes. These generic classes perform the same actions as the previously described final plugin classes. However, instead of hardcoding the parameter initialization values into the class, the generic class reads a configuration file to initialize the same parameters. The name of this configuration file is specified in the main ntDTS configuration file and passed by the WG 504 and DC 505 objects to the plugin classes. Thus, the addition of a new workload requires the creation of a new plugin configuration file and the specification of the configuration file name in the main ntDTS configuration file. No code compilation is needed. FIG. 11 shows the plugin configuration file for the same workload associated with FIG. 10.

Fault Injection Mechanism

Figures 12, 13:
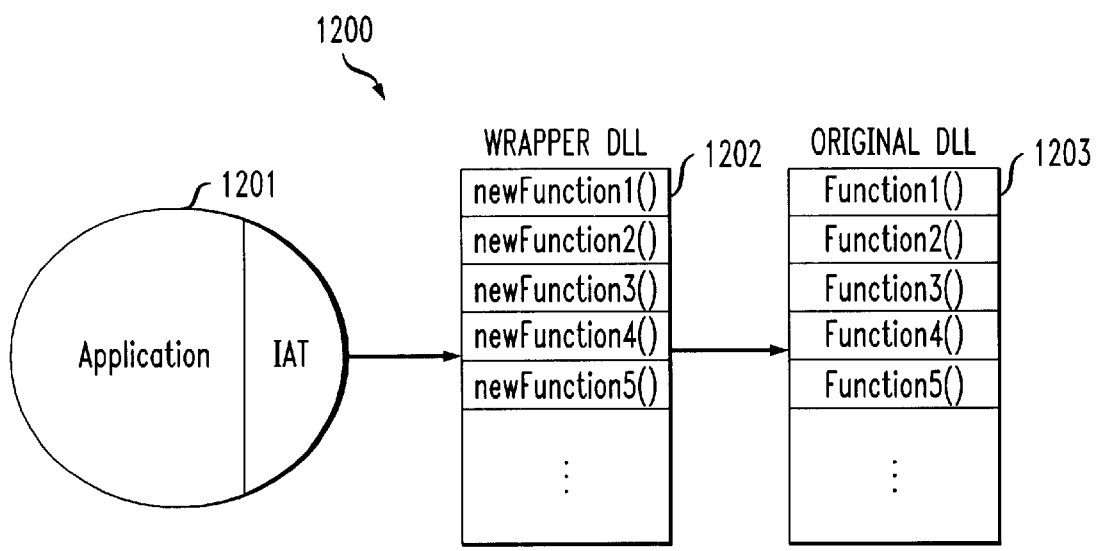
FIG. 12 shows, in simplified form, the fault injection mechanism for the particular embodiment of the invention of FIG. 5.
FIG. 13 is a graphical representation of TABLE 3 including a list of injection parameters.

FIG. 12 shows, in simplified form, the fault injection mechanism 1200 for this particular embodiment of the invention of FIG. 5. Specifically, shown is the specific application 1201 including an import address table (IAT), wrapper DLL 1202 and original wrapper 1203. Wrapper DLL 1202 and original DLL 1203 both include a prescribed number of functions as shown.

The fault injection mechanism that is currently integrated as part of the ntDTS fault injection tool is based on the interception of system calls in the server program. For Windows NT systems, most system calls are invoked via functions in system DLLs (Dynamically Linked Libraries). By interrupting the control flow in these functions, the fault injection mechanism has the capability to alter the execution of the DLL functions, and, therefore, also the execution of associated system calls. The implementation of the fault injection mechanism involves several steps:

1. Create a wrapper DLL 1202.
2. Alter the target application Import Address Table (IAT) entries in 1201 to point to the wrapper DLL 1202.
3. Create configuration files to activate the wrapper DLL 1202.

The main idea is to force the application to access the wrapper DLL 1202 in such a manner that the application believes it is accessing the original DLL 1203. This deception allows extra code in the wrapper DLL 1202 to be executed whenever a function in the original DLL 1203 is invoked. Because the application believes it is still calling functions in the original DLL 1203, the only required modification to the application is to redirect function calls from the original DLL 1203 to the wrapper DLL 1202. This is a significant advantage of the invention.

The wrapper DLL 1202 performs several actions. First, it reads in a fault configuration file, which contains parameters for a single fault injection run. The contents of the configuration file are listed in the list of fault injection parameters in Table 3 of FIG. 13. A new configuration file is created for each fault injection run. For each function that is called, the corresponding function in the wrapper DLL 1202 determines if a fault should be injected for that function. If so, the appropriate function parameter is corrupted, and the details of the injected fault are recorded in an output file. This output file is read by DCRemote 512 (FIG. 5) to determine if a fault was actually injected. Finally, each function in the wrapper DLL 1202 calls the corresponding function in the original DLL 1203.

Once a wrapper DLL 1202 has been created for a particular DLL, that wrapper DLL 1202 can be used for any application that uses the corresponding original DLL 1203. The wrapper DLL 1202 for KERNEL32.dll is included with the default ntDTS fault injection tool. To facilitate the creation of additional wrapper DLLs, several perl scripts are included with the ntDTS fault injection tool. These scripts include the following:

make_functionlist.perl
    The name of the DLL is passed as a command-line parameter to this script, and a list of functions exported by that DLL is produced. This list is used by the make_proto_file.perl script.

make_proto_file.perl

This script takes as input a list of functions from a particular Windows NT DLL. In order to inject the parameters of a function call, it is necessary to know the function prototype. Along with the list of functions to include in the wrapper DLL, a list of C-language include files is needed to find the function prototypes. As each function is found in the include files, the function prototype is saved in the output file. If the function prototype is not found, then the name of the function is saved in the output without prototype information. Some DLL functions have no specific implementation but are simply aliases for other functions. For example, the 1strlen( ) function has an entry in KERNEL32.dll. However, its implementation is defined by the 1strlenA( ) function. For such functions, the input list of functions can utilize the following alias notation:
=1strlen 1strlenA make_source_files.perl The prototype file created by make_proto_file.perl is used as input to make_source_files.perl to create the *.c, *.h, and *.def source files needed to create the wrapper DLL 1202. A separate implementation is needed for each function because the number of parameters and the size of each parameter will vary for each function. The source files are then compiled to build the wrapper DLL 1202.

create_faultsdat. perl

After the wrapper DLL 1202 has been built, this script is used to create the fault list file, in which all wrapper DLL 1202 functions are listed along with the number of parameters for each function. Only functions that have at least one parameter are listed in the fault list file because parameter corruption is currently the only type of fault injection implemented.

Several types of fault injection can be supported with this wrapper DLL method:

1. Corrupt input parameters
   The function parameters are corrupted. Parameters can be corrupted in the following ways:
   (a) Reset all bits to zero.
   (b) Set all bits to one.
   (c) Flip all bits by XOR'ing all bits with 0×1.
   (d) Add a fixed offset to scalar parameters.
   (e) Set scalar parameters to a fixed value (which may depend on the radix of the number).
   (f) Adjust pointers to legal or illegal locations.
   (g) Shift the order of parameters.
   This requires knowledge of parameter sizes.
2. Corrupt the return value
   For functions with a return value, a different return value can be returned. The same types of parameter corruption listed above can be used to corrupt the return value.
3. Return without calling the original function
   Usually the wrapper DLL 1202 function will eventually call the function in the original DLL 1203. However, bypassing the function call altogether introduces another type of event upset. This necessarily implies that the return value will also be counterfeit.

Figure 14:
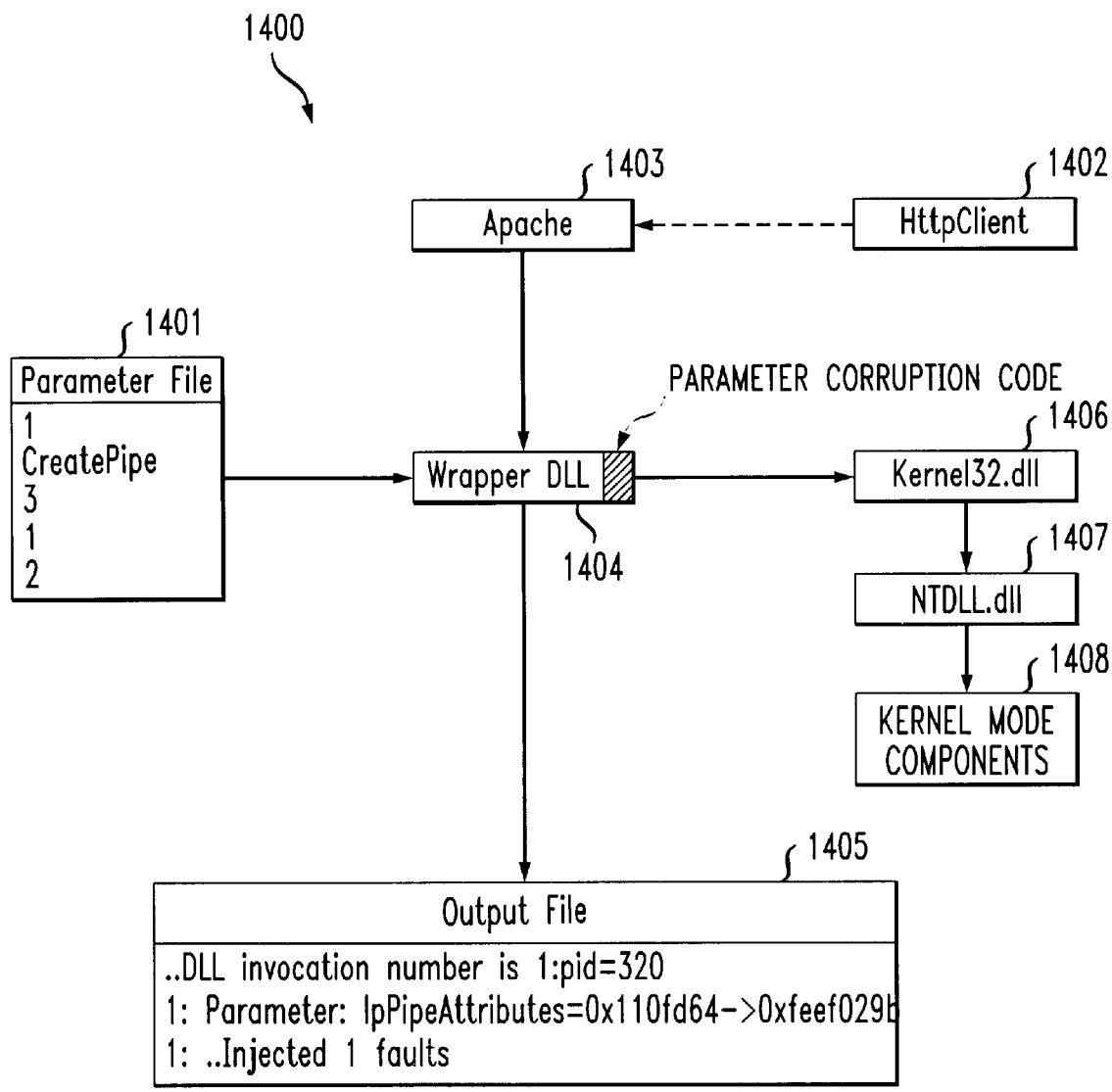
FIG. 14 illustrates a flow diagram of a single fault injection run for the embodiment of the invention of FIG. 5.

The sequence of events for a single fault injection run is shown in FIG. 14. To this end, FIG. 14 illustrates a flow diagram of a single fault injection run 1400 for the embodiment of the invention of FIG. 5.

The rectangular boxes represent executable code: Apache is the Apache application code, which is linked at run-time to the wrapper DLL, KERNEL32.dll, and NTDLL.dll. Http-Client is a small program that sends HTTP requests to the Apache web server; Kernel Mode Components include the NT executive, kernel, and device drivers. The objects labeled Parameter File and Output File contains the contents from an actual fault injection run. The following describe the sequence of events for a sample fault injection run:

In step 1401, the fault injection parameter file is read by the initialization routine in the wrapper DLL 1202 as Apache is started and linked with its associated DLLs.

In step 1402, the HttpClient program is started and sends a request to Apache.

In step 1403, the Apache processes the HTTP request and as a consequence calls the KERNEL32.dll function that is to be injected, which is CreatePipe( ) in this example.

In step 1404, the modified Apache IAT calls the wrapper DLL 1202 function corresponding to CreatePipe( ). Based on the contents of the fault injection parameter file, the wrapper DLL 1202 corrupts the first invocation of CreatePipe( ) in the first Apache process. The third parameter is injected with fault type 2 (XOR all bits with 0×1).

In step 1405, the wrapper DLL 1202 creates an output file containing the details of the fault that was injected. If the CreatePipe( ) function is never called, then the output file would contain only the first line about the invocation number and PID.

In step 1406, the actual CreatePipe( ) function in KERNEL32.dll is called.

In step 1407, the CreatePipe( ) function eventually calls functions in NTDLL.dll, which in step 1408 access the resources in the kernel mode components.

Other fault injection mechanisms could also be added to the ntDTS fault injection tool. The general architecture supports multiple fault injection mechanisms.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use in testing software system dependability in light of unintended and/or unexpected events comprising:

a plurality of core class units including at least a fault injector core class unit for controlling, and/or configuring, and/or managing an associated fault injector plugin class unit, a workload generator class core unit for controlling, and/or configuring, and/or managing an associated fault workload generator plugin class unit and a data collector class core unit for controlling, and/or configuring, and/or managing an associated data collector plugin class unit; and a plurality of said plugin class units including at least said associated fault injector plugin class unit for controllably injecting at least a prescribed fault into an application program being evaluated, said associated workload generator plugin class unit for controllably effecting the execution and/or termination of programs for effecting said evaluation of said application program and said associated data collector plugin class unit for controllably collecting data from said application program being evaluated in response to said fault being injected therein, wherein each of said associated plugin class units is a dynamically loaded object that is linked with an object instantiated from its associated core class unit without recompilation of the associated core class unit.

2. The invention as defined in claim 1 wherein each of said associated plugin class units includes a base class unit corresponding to its associated core class unit, wherein actions performed by each of said associated plugin class units are identical and/or similar for a plurality of processes with it and wherein said identical and/or similar actions are implemented in said base class unit of said associated plugin unit.

3. The invention as defined in claim 2 wherein one or more of said associated plugin class units includes one or more custom class units that are hierarchically derived from said base class unit of said associated plugin class unit.

4. The invention as defined in claim 3 wherein each of said class units is an object in an object-oriented architecture.

5. The invention as defined in claim 4 further including a plurality of remote objects associated on a one-to-one basis with said plurality of core class objects and including at least a fault injector remote object, a workload generator remote object and a data collector remote object.

6. The invention as defined in claim 5 wherein under control of said fault injector core object said fault injector remote object implements a prescribed fault injection mechanism.

7. The invention as defined in claim 6 wherein said fault injection core object determines parameters for the fault to be injected by said fault injector remote object using said prescribed fault injection mechanism.

8. The invention as defined in claim 7 wherein said fault injection mechanism includes interception of system calls and corruption of system call parameters causing resulting errors in said application.

9. The invention as defined in claim 5 wherein under control of said workload generator core object said workload generator remote object is caused to run a prescribed workload for the application program being evaluated.

10. The invention as defined in claim 9 wherein said workload generator core object initiates programs and creates program inputs and environments in a controlled manner so that said prescribed workload is generated in a reproducible manner.

11. The invention as defined in claim 10 wherein said workload remote object effects preparation for a fault injection run, executes the workload by starting workload programs in a prescribed order and terminates workload programs in a manner so that said data collector remote object can collect the results of the fault injection run on the workload programs.

12. The invention as defined in claim 11 wherein said prescribed workload includes a prescribed set of programs for this particular workload.

13. The invention as defined in claim 12 wherein said set of program includes at least an application program and a client program.

14. The invention as defined in claim 13 wherein said set of programs further includes at least a middleware program.

15. The invention as defined in claim 5 wherein under control of said data collector core object said data collector remote object is caused to obtain results of a fault injection run.

16. The invention as defined in claim 15 further including a graphical user interface for visually displaying said results.

17. Apparatus for use in testing software system dependability in light of unintended and/or unexpected events comprising:

a plurality of core class means including at least fault injector core class means for controlling, and/or configuring, and/or managing an associated fault injector plugin class means, a workload generator core class means for controlling, and/or configuring, and/or managing an associated fault workload generator plugin class means and a data collector core class means for controlling, and/or configuring, and/or managing an associated data collector plugin class means; and a plurality of said plugin class means including at least said associated fault injector plugin class means for controllably injecting at least a prescribed fault into an application program being evaluated, said associated workload generator plugin class means for controllably effecting the execution and/or termination of programs for effecting said evaluation of said application program and said associated data collector plugin class means for controllably collecting data from said application program being evaluated in response to said fault being injected therein, wherein each of said associated plugin class means is a dynamically loaded object that is linked with an object instantiated from its associated core class means without recompilation of the associated core class means.

18. The invention as defined in claim 17 wherein actions performed by each of said associated plugin class means are identical and/or similar for a plurality of processes with it and wherein each of said associated plugin class means includes a base class means corresponding to its associated core class means for implementing said similar and/or identical actions.

19. The invention as defined in claim 18 wherein one or more of said associated plugin class means includes one or more custom class means that are hierarchically derived from said base class unit of said associated plugin class means.

20. The invention as defined in claim 19 wherein each of said class means is an object in an object-oriented architecture.

21. The invention as defined in claim 20 further including a plurality of remote objects associated on a one-to-one basis with said plurality of core class objects and including at least a fault injector remote object, a workload generator remote object and a data collector remote object.

22. The invention as defined in claim 21 wherein under control of said fault injector core object said fault injector remote object implements a prescribed fault injection mechanism.

23. The invention as defined in claim 21 wherein under control of said workload generator core object said workload generator remote object is caused to run a prescribed workload for the application program being evaluated.

24. The invention as defined in claim 23 wherein said workload generator core object initiates programs and creates program inputs and environments in a controlled manner so that said prescribed workload is generated in a reproducible manner.

25. The invention as defined in claim 24 wherein said workload remote object effects preparation for a fault injection run, executes the workload by starting workload programs in a prescribed order and terminates workload programs in a manner so that said data collector remote object can collect the results of the fault injection run on the workload programs.

26. The invention as defined in claim 21 wherein under control of said data collector core object said data collector remote object is caused to obtain results of a fault injection run.

27. The invention as defined in claim 26 further including a graphical user interface for visually displaying said results.

28. A method for use in testing software system dependability in light of unintended and/or unexpected events comprising the steps of:
   controlling, and/or configuring, and/or managing an associated fault injector plugin class unit by a fault injector core class unit to controllably inject at least a prescribed fault into an application program being evaluated;
   controlling, and/or configuring, and/or managing an associated fault workload generator plugin class unit by a workload generator class core unit to controllably effect the execution and/or termination of programs for effecting said evaluation of said application program; and
   controlling, and/or configuring, and/or managing an associated data collector plugin class unit by a data collector class core unit to controllably collect data from said application program being evaluated in response to said fault being injected therein,
   wherein each of said associated plugin class units is a dynamically loaded object that is linked with an object instantiated from its associated core class unit without recompilation of the associated core class unit.

29. The method as defined in claim 28 wherein each of said associated plugin class units includes a base class unit corresponding to its associated core class unit, wherein actions performed by each of said associated plugin class units are identical and/or similar for a plurality of processes with it, and further including a step of implementing said identical and/or similar actions in said base class unit of said associated plugin unit.

30. The method as defined in claim 29 further including a step of hierarchically deriving one or more custom class units from said base class unit of said associated plugin class unit for one or more of said associated plugin class units.

31. The method as defined in claim 30 wherein each of said class units is an object in an object-oriented architecture.

32. The method as defined in claim 31 further including a plurality of remote objects associated on a one-to-one basis with said plurality of core class objects and including at least a fault injector remote object, a workload generator remote object and a data collector remote object.

33. The method as defined in claim 32 further including a step, under control of said fault injector core object, of said fault injector remote object implementing a prescribed fault injection mechanism.

34. The method as defined in claim 33 further including a step of effecting a fault injection run.

35. The method as defined in claim 34 wherein a workload set is employed including a first set of workloads, a second set of functions, a third set of function parameters, a fourth set of function iterations and a fifth set of fault types and wherein each of said sets includes at least one item, and further including a step of effecting a fault injection run for each of said items in each of said sets.

36. The method as defined in claim 35 wherein said step of effecting a fault injection run includes the steps of creating a fault parameter file for said fault injector, preparing said workload generator, starting said application program causing a fault to injected therein, causing said workload generator to wait for said application program to be up and running, causing a client program to be started for said workload generator, causing termination of said workload generator and gathering results of said fault injection run.

37. The method as defined in claim 36 further including the step of visually displaying said results of said fault injection run.

38. The method as defined in claim 36 wherein said step of effecting a fault injection run includes a step of implementing a prescribed fault injection mechanism.

39. The method as defined in claim 38 wherein said step of implementing said prescribed fault injection mechanism includes steps of creating a wrapper dynamically linked library (DLL), causing said application program to invoke execution functions in said wrapper DLL and creating configuration files to activate said wrapper DLL.

40. The method as defined in claim 39 wherein said wrapper DLL perform steps of reading a fault configuration file, creating a new configuration file for each new fault injection run, for each function that is called, determining if a fault should be injected for that called function, if so, injecting said fault and each function in said wrapper DLL calling a corresponding function in an original DLL.

41. The method as defined in claim 40 wherein said step of injecting said fault includes a step of corrupting parameters of a function call.

42. The method as defined in claim 41 further including a step of visually displaying the results of said fault injection run.

* * * * *